(12) United States Patent
Wang et al.

(10) Patent No.: US 9,547,456 B2
(45) Date of Patent: Jan. 17, 2017

(54) METHOD AND APPARATUS FOR EFFICIENT DATA COPYING AND DATA MIGRATION

(71) Applicant: EMC Corporation, Hopkinton, MA (US)

(72) Inventors: Lei Wang, Shanghai (CN); Xiangqing Yang, Shanghai (CN); Ren Ren, Shanghai (CN); Xi Ma, Shanghai (CN); Yin Zhu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/211,546

(22) Filed: Mar. 14, 2014

(65) Prior Publication Data

US 2014/0281221 A1 Sep. 18, 2014

(30) Foreign Application Priority Data

Mar. 15, 2013 (CN) .......................... 2013 1 0095686

(51) Int. Cl.
*G06F 13/12* (2006.01)
*G06F 3/06* (2006.01)
*G06F 12/16* (2006.01)

(52) U.S. Cl.
CPC .............. *G06F 3/065* (2013.01); *G06F 3/061* (2013.01); *G06F 3/0689* (2013.01); *G06F 12/16* (2013.01)

(58) Field of Classification Search
CPC ................................... G06F 12/16; G06F 3/00
USPC .............................................. 710/62; 711/162
See application file for complete search history.

(56) References Cited

U.S. PATENT DOCUMENTS

| | | | |
|---|---|---|---|
| 6,233,648 B1 * | 5/2001 | Tomita | G06F 3/0613 711/103 |
| 7,353,299 B2 * | 4/2008 | Hattrup et al. | 710/30 |
| 7,574,560 B2 * | 8/2009 | MacHardy et al. | 711/114 |
| 7,702,877 B2 * | 4/2010 | Braun et al. | 711/172 |
| 8,725,940 B2 * | 5/2014 | Grube et al. | 711/114 |
| 8,850,113 B2 * | 9/2014 | Baptist et al. | 711/114 |
| 8,914,597 B2 * | 12/2014 | Benhase et al. | 711/162 |
| 2005/0198450 A1 * | 9/2005 | Corrado et al. | 711/162 |

* cited by examiner

*Primary Examiner* — Titus Wong
(74) *Attorney, Agent, or Firm* — Krishnendu Gupta; Konrad R. Lee

(57) ABSTRACT

Various embodiments of the present invention relate to a method and apparatus for data copy. Specifically, in one embodiment of the present invention there is provided a method for data copy, comprising: obtaining a data source on which data copy is to be executed; determining a size P of a block extent based on which the data source is divided; dividing the data source into at least one data block based on the size P of the block extent; and copying data from the data source to a data target in the basic unit of the at least one data block; wherein the size P of the block extent is an integral multiple of a size R of a read/write unit supported by underlying architecture. In one embodiment of the present invention, there is provided an apparatus for data copy.

12 Claims, 7 Drawing Sheets

300

| 310A Data Block |
|---|

| 320A Read/Write Cell |
|---|

| 330A Copy Buffer |
|---|

Fig. 3

METHOD AND APPARATUS FOR EFFICIENT DATA COPYING AND DATA MIGRATION

RELATED APPLICATION

This application claims priority from Chinese Patent Application Serial No. CN201310095686.2 filed on Mar. 15, 2013 entitled "Method and Apparatus for Data Copy," the content and teachings of which are hereby incorporated by reference in their entirety.

FIELD

Embodiments of the present invention relate to data processing, and more specifically, for data copying between a data source and a data target.

BACKGROUND

With developments of computer hardware and software technology, storage devices such as hard drives are capable of providing a large number of users with an increasingly large data storage capacity, and speed of accessing these storage devices has also significantly improved. During usage of various applications, data copying and data migration are frequently involved, in which copy operation from a data source to a data target are typically performed. Generally as understood by one skilled in the art, data copying (or sometimes also referred to as data copy) refers to retaining data at a data source after completion of copying process, while data migration refers to deleting data at the data source after completion of the copying process.

Currently, data amount involved in various applications is becoming increasingly larger, for example, as large as dozens of gigabytes or even more. The frequency of executing data copy has been showing trends of gradually increasing. For example, database systems of enterprises such as banks might perform data backup regularly based on the decision, such as per day, per hour, or event at higher frequency, so that efficiency of data backup becomes one of the important factors that affect the operating efficiency of computer systems.

Although such technical solutions have been developed as recording the difference between a current version of a to-be-copied data source and its previous backup version by using record element sets such as metadata and bitmap, these technical solutions fail to make sufficient use of various resources as a function of time; and moreover, since the to-be-copied data might be divided into data blocks having improper sizes, occurrences of making copy via a copy buffer and/or occurrences of read/write to hardware devices are increased, and further the efficiency of data copy is lowered.

SUMMARY

Therefore, it is desired to develop and implement a technical solution capable of improving efficiency of data copy, and to that end it is preferred that the technical solution be implemented without changing hardware configurations of the existing data storage devices to the extent possible. In addition, it is desired that the technical solution can take into consideration the difference in various underlying storage systems so as to further improve the efficiency of data copy from the perspective of reducing read/write operations on hardware storage devices.

In one embodiment of the present invention, there is provided an apparatus, computer program product and a method for data copy (copying), by obtaining or identifying a data source on which a data copy is to be executed; determining a size P of a block extent based on which the data source is divided; dividing the data source into at least one data block based on the size P of the block extent; and copying data from the data source to a data target in the basic unit of the at least one data block; wherein the size P of the block extent is an integral multiple of a size R of a read/write unit (which can also be referred to as a red/write cell), which is supported by the underlying architecture.

In one embodiment of the present invention, the read/write unit is a data sector in a disk or in a data trunk in a Redundant Array of Independent Disks (RAID).

In one embodiment of the present invention, the size P of the block extent is an integral multiple of a size B of a copy buffer, wherein the copy buffer is employed while copying data from the data source to the data target. The size P of the block extent creates a number of divided data blocks which is less than or equal to a number M of elements in a record element set, wherein an element in the record element set is used for marking whether a data block has been modified or not. Determining the size P of the block extent based on which the data source is divided is by determining the minimum value of the size of P of the block extent which makes the number of the data blocks less than or equal the number M of elements in the record element set.

The size of P of the block extent is determined using the formula $$P = \left\lfloor \frac{O + N \times M - 1}{N \times M} \right\rfloor \times N,$$

where N is the least common multiple of the size B if the copy buffer and the size R of the read/write unit, O is the size of the data source and the maximum number of record elements in the record element set is called length of the record element set, represented by M. In a further embodiment, copying data from the data source to the data target in the basic unit of the at least one data block includes in response to an element in the record element set having been marked, copying a data block associated with the marked element in the data source to the data target. In a further embodiment, in response to a data in the data block of the at least one data block having been modified, marking an element associated with the data block in the record element set.

The method, computer program product and apparatus for data copy as provided according to the various embodiments of the present invention can be implemented under an existing hardware architecture. Moreover, the method and apparatus provided by the present invention can make more sufficient use of a copy buffer and a storage space of an underlying read/write unit and further reduce occurrences of copy and read/write operations via the copy buffer during a single data copy.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings:

FIG. 3 illustrates a schematic view of different basic units involved during data copy according to solution;

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
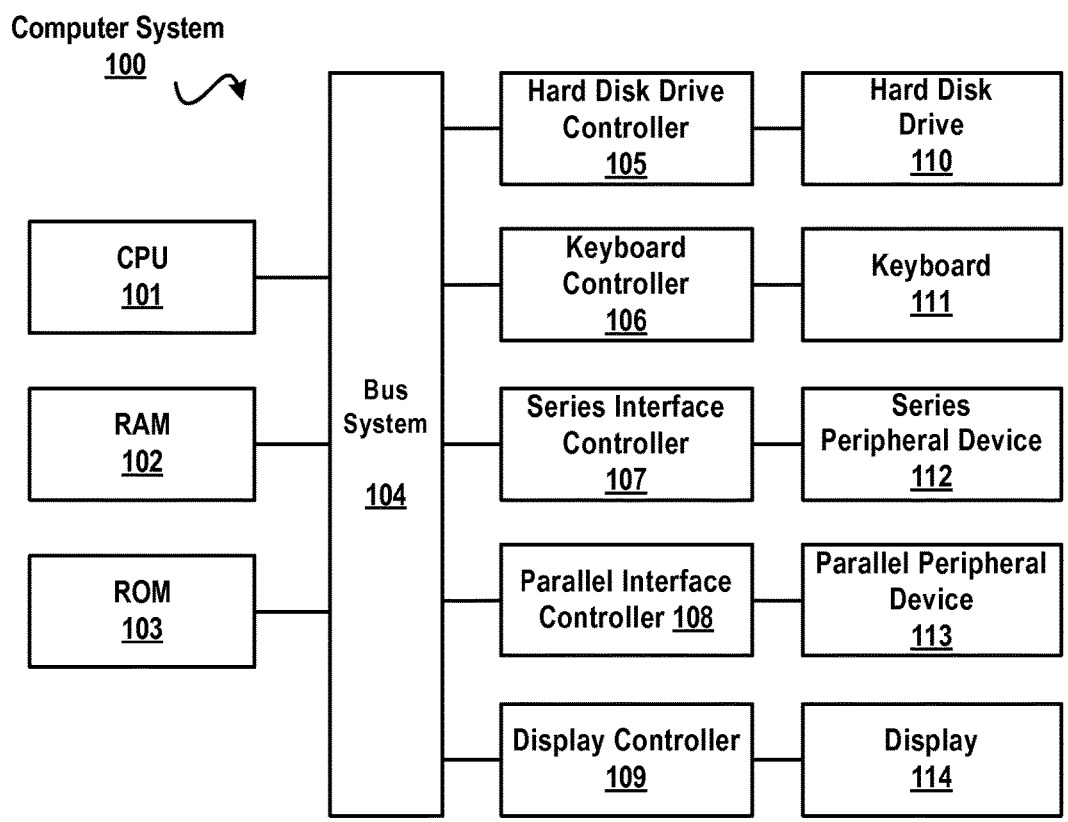
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further although in FIG. 1 the computer system which is applicable to implement the present invention is illustrated by taking a physical computer as an example, since data copy operations are usually conducted at a higher abstract layer, the present disclosure does not pay attention to details such as whether data copy operations are implemented at a real physical machine or a virtual machine. Specifically, when the present disclosure is implemented at a virtual machine, a host where the virtual machine is located may provide concrete operations as will be described below.

Figure 2A:
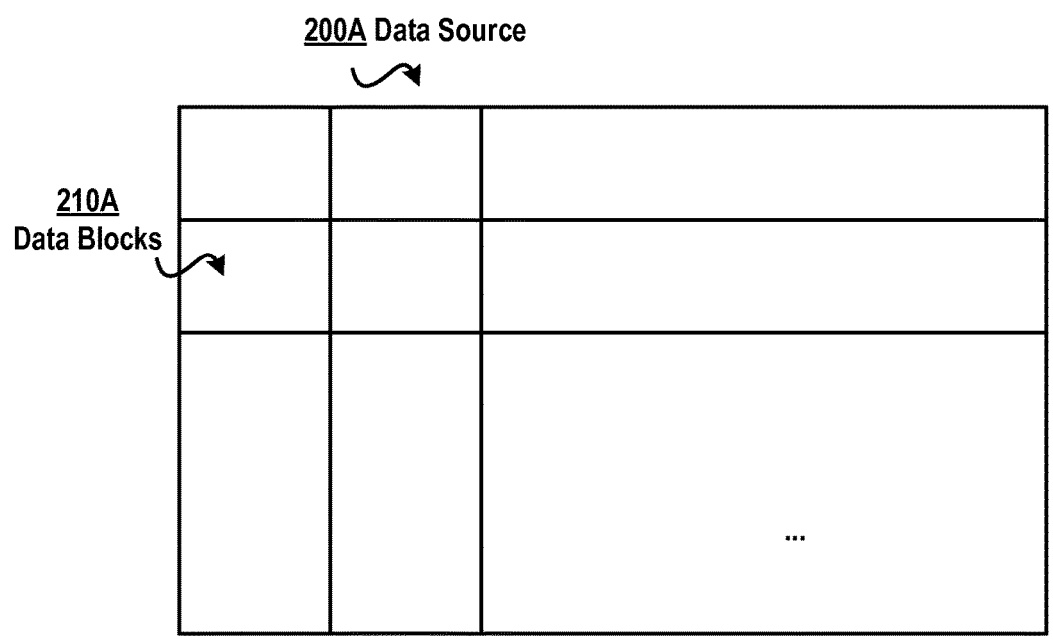
FIGS. 2A and 2B illustrate respective schematic views of a data source and a record element set involved during data copy according to one solution.
Figure 2B:
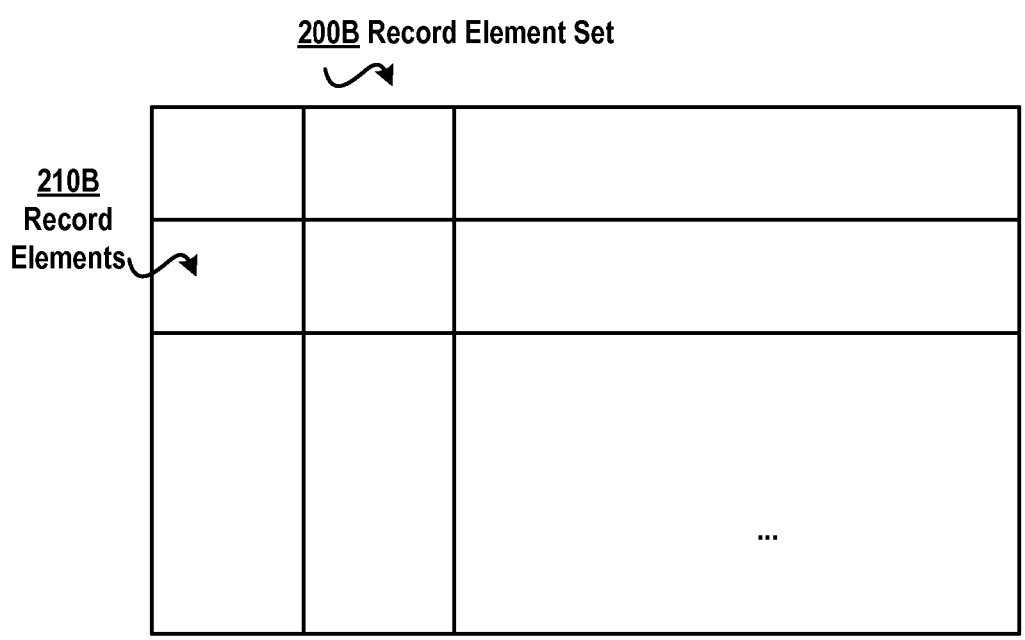

FIGS. 2A and 2B illustrate a schematic view 200A of a data source and a schematic view 200B of a record element set involved during data copy according to one solution, respectively. As illustrated in FIG. 2, a data source 200A refers to to-be-copied data; for example, when a user wants to copy data in an entire hard drive (e.g. 250 G), data source 200A may represent data of 250 G in the hard drive. According to one solution of copy technology, data source 200A may be divided into a plurality of data blocks 210A, and a record element set 200B (as shown in FIG. 2B) corresponding to data source 200A may be configured to record data updates in data source 200A. In one technical solution, record element set 200B may have record elements 210B of the same number as the number (e.g. 1024) of data blocks 210A in data source 200A. Each record element 210B in record element set 200B may be used for indicating whether the content of each data block 210A in data source 200A has been updated or not. For example, one bit may be used for representing one record element 210B, at which point the size of record element set 200B is 1024 bits; alternatively, other length may also be used for representing the record element.

The size of each data block and the number of record elements in the record element set may be defined based on different methods. The record element set may record the difference between the data source and the data target. Based on these record element sets, data is copied, and the progress of data copy and migration may be recorded. Usually, the number of record elements in the record element set is limited and fixed. There exist various design methods for determining the data block length represented by a single record element.

Each data block may correspond to each record element, so record element set 200B may indicate which data block(s) in data source 200A has (have) been updated, and further indicate the progress of data copy. For example, while executing data copy for the first time, all data blocks 210A in data source 200A may be copied to the data target; and while executing data copy subsequently, according to whether respective record elements 210B in record element set 200B have been marked or not, only those being updated may be copied so that the workload during data copy can be reduced substantially.

Various kinds of data cells may be involved in data copy. The meaning of each term is introduced first.
1) Data source refers to data on which data copy is to be executed. For example, the size of the data source may be represented by symbol O;
2) Block extent refers to the scale based on which the data source is divided into data blocks. For example, the size of the block extent may be represented by symbol P;
3) Record element set refers to a data structure for recording whether each data block in the data source has been updated or not, record elements in the record element set correspond to data blocks in the data source one by one, and the maximum number of record elements in the record element set is called length of the record element set and represented by, for example symbol M;
4) Copy buffer refers to a temporal storage unit for transiting data between the data source and the data target during data copy. For example, the size of the copy buffer may be represented by symbol B; and
5) Read/write cell (also referred to as a unit) refers to the minimum read/write unit that is supported by hardware during executing hardware copy. For example, in a regular hard drive the minimum read/write unit may be sector, while in a Redundant Array of Independent Disks (RAID) the minimum read/write unit may be trunk in data strips. For example, the size of the read/write cell (unit) may be represented by symbol R.

According to one solution, a length averaging method may be employed, i.e. the data source is evenly divided into a plurality of data blocks and the number of the data blocks is equal to the length of the record element set. At this point, the size of the block extent $$P = \left\lceil \frac{O}{M} \right\rceil;$$

here the rounding symbol ⌈ ⌉ denotes a ceiling function. This method may use each record element in the record element set; however, since the length of the data source is not necessarily an integral multiple of the size P of the block extent, the size P of the block extent might be unaligned with the size of other data cell (also referred to as data unit) in the system.

In the context of the present disclosure, the situation where value A is not an integral multiple of value B may be referred to as A being unaligned with B. For example, suppose the size P of the block extent is 257 kB while the size B of the copy buffer is 128 kB, then P is unaligned with B.

FIG. 3 illustrates a schematic view 300 of different basic units involved during data copy according to one particular solution. Now with reference to FIG. 3, detailed explanations are given to the meaning of "being unaligned" resulting from the length averaging method shown in FIG. 2. For example, when the size P of the block extent is not an integral multiple of the size B of the copy buffer, every time data copy is executed via the copy buffer, a data block 310A cannot be split into a plurality of sections of copy buffer 330A, with length of each section being that of copy buffer 330A; and moreover, although the size of the remaining portion (i.e. the last segment) in data block 310A is not sufficient to fill in the size B of one copy buffer, then data copy should be executed via copy buffer 330A in a separate round. Such situation of being unaligned reduces the efficiency of data copy.

For example, where the size P of the block extent is 257 kB and while the size B of the copy buffer is 128 kB, each data block that is divided according to P will be split into 3 segments, among which the first and the second segment is 128 kB while the third segment is only 1 kB. At this point, three rounds of data copy via the copy buffer are required before completing copying of data in each data block.

Alternatively, when data copy is executed physically on a storage medium such as a hard drive, the minimum unit of read/write to the storage medium is not necessarily the size B of the copy buffer, but is usually less than the size B of the copy buffer. In this case, the copy buffer might be further split. For example, in the case of RAID, the read/write unit is trunk (e.g. 64 kB) in data strips; if the size B of copy buffer 330A is 128 kB while the size R of a read/write cell 320A is 64 kB, then the copy buffer needs to be further split. In addition, when data being written is less than one trunk, first the entire trunk is read, and then the remaining data is combined before the trunk is finally written to the disk. At this point, the read operation becomes an additional action. Thus, if the initial address or length of data being written is unaligned with trunk, some performance loss may be incurred.

Apparently, if the size O of the data source is unaligned with the size R of the read/write cell and the size B of the copy buffer, then the size of the block extent obtained according length averaging method discussed above is also unaligned with R and B. While copying data, a waste of the copy buffer and additional read/write operations will be caused, which further leads to relatively large performance losses. Therefore, the operating efficiency of solving the length P of the block extent by the length averaging method and executing data copy based on the length P is far from satisfactory.

In view of the drawbacks mentioned above in the technical solutions, the present disclosure proposes a method for data copy, comprising: obtaining/identifying a data source on which data copy is to be executed; determining the size P of a block extent based on which the data source is divided; dividing the data source into at least one data block based on the size P of the block extent; and copying data from the data source to a data target in the basic unit of the at least one data block; wherein the size P of the block extent is an integral multiple of the size R of a read/write cell supported by underlying architecture.

Figure 4:
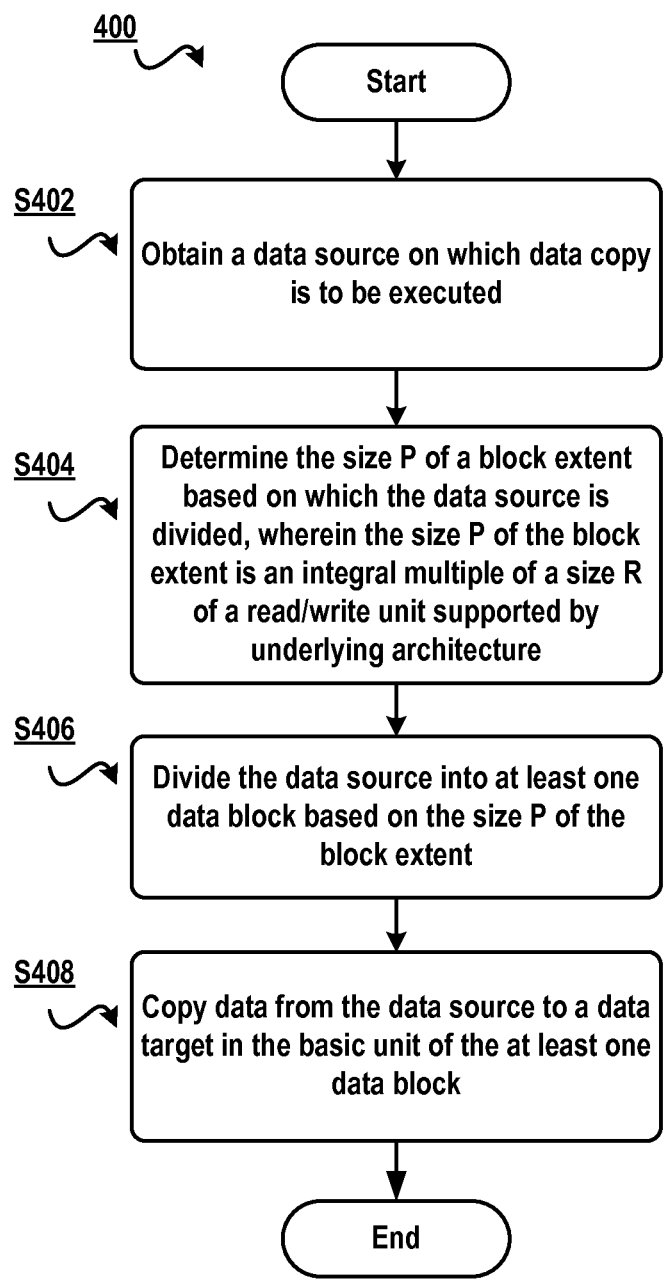
FIG. 4 illustrates a flowchart of a method for data copy according to one embodiment of the present invention.

FIG. 4 illustrates a flowchart 400 of a method for data copy according to one embodiment of the present invention. Specifically, a data source on which data copy is to be executed is obtained in step S402. Here the data source is data on which data copy is to be executed, for example, includes all data in a hard drive.

In step S404, the size P of a block extent based on which the data source is divided is determined, wherein the size P of the block extent is an integral multiple of the size R of a read/write cell/unit, which is typically supported by the underlying architecture. Note, that while executing data copy, since record element(s) in the record element set has (have) already identified data in which data block(s) has (have) been updated, only a data block that is identified as updated needs to be copied. Although from the perspective of higher level the data block is a basic unit for executing data copy, physically the minimum unit for executing copy is the read/write cell. Therefore, the size R of the read/write cell decides how many rounds of read/write operations on the storage medium are required in order to copy the data block.

By setting the size P of the block extent as an integral multiple of the size R of the read/write cell, each data block may be aligned with the read/write cell, thereby making more efficient use of the read/write cell. In other words, every time a read/write operation is performed, all space in the read/write cell can be utilized, and additional read/write operations are avoided to the extent possible. For example, suppose the size of the read/write cell is 64 kB, data involved in each read/write operation may be 64 kB.

In step S406, the data source is divided into at least one data block based on the size P of the block extent. After determining the dividing scale P, the data source may be divided into a plurality of data blocks according to the size P of the block extent. For example, suppose the size O of the data source is 250 G while the size P of the block extent is 0.25 G, then the entire data source may be divided into 1000 data blocks.

Note, there is a difference between the method according to one embodiment of the present invention and the existing length averaging method for data copy. In the embodiment of the present invention, first the size P of the block extent is determined, and then based on the size O of the data source and the size P of the block extent, it is determined how many data blocks the data source is divided into. However, in the above-described length averaging method, it is determined that the data source is divided into M data blocks (i.e. the length M of the record element set), and subsequently the size P of the block extent is calculated based on the size O of the data source and the number M of data blocks. Although the length averaging method is simple and easy to implement, the size P of the block extent obtained as such is not an integral multiple of the size R of the read/write cell, thereby leading to additional read/write operations.

In step S408, data is copied from the data source to a data target in the basic unit of the at least one data block. The size of each data block obtained from steps S402-S406 is an integral multiple of the size R of the read/write cell, so all space in the read/write cell can be utilized to execute data copy and occurrences of read/write to the storage medium can be reduced to the maximum degree possible.

In one embodiment of the present invention, the read/write cell is a data sector in a disk or data trunk in a Redundant Array of Independent Disks (RAID). Various embodiments of the present invention take into consideration the difference in the read/write cells that may be supported by underlying architectures of computer devices executing data copy, so as to achieve high-efficiency data copy for the different underlying architectures. For example, a normal disk takes sector as the basic read/write unit, at which point the minimum read/write unit is 512 B; for another example, RAID takes trunk in strips as the basic read/write unit, at which point the minimum read/write unit is 64 kB.

RAID is a more reliable data storage solution, wherein the fundamental feature is to combine multiple disks into an array of disks so as to provide a higher capacity or reliability. According to different versions being selected, in RAID a single disk has more advantages, such as enhancing the data set integration, enhancing fault-tolerant functionality, increasing processing amount or capacity, etc. In RAID, when data being written is less than one trunk, additional read operations are required, thereby lowering the efficiency of the data copy. By taking into consideration different types of read/write cells supported by regular disks and RAID, the various embodiments of the present invention can provide high-efficiency data copy operations for different types of underlying architectures.

In one embodiment of the present invention, the size P of the block extent is an integral multiple of the size B of a copy buffer used during copying data from the data source to the data target. The copy buffer is a temporary storage space for transiting data between the data source and the data target, and the data copy operation is completed by multiple occurrences of a single copy (the size of data copied each time is equal to the size of the copy buffer, e.g. 128 kB) executed according to a certain offset/predetermined step. When the length of the data block exceeds the size of the copy buffer, the data block needs to be split into multiple occurrences of copy. If the data block is unaligned with the copy buffer, then the last occurrence of copy actually does not make full use of the length of the entire copy buffer, thereby causing a waste to some degree.

In the embodiments of the present invention, by setting the size P of the block extent as an integral multiple of the size B of the copy buffer, each data block may be aligned with the copy buffer, and further, the size of the entire copy buffer may be utilized sufficiently in each occurrence of the data copy.

In one embodiment of the present invention, the size P of the block extent is an integral multiple of the least common multiple of the size R of the read/write cell and the size B of the copy buffer. To make the size P of the block extent aligned with the size R of the read/write cell and the size B of the copy buffer, first the least common multiple N of the size R of the read/write cell and the size B of the copy buffer is calculated, and then the size P of the block extent is set as an integral multiple of N, thereby determining the size P of the block extent conveniently and rapidly.

In one embodiment of the present invention, the size P of the block extent makes the number of the divided data blocks less than or equal to the number M of elements in a record element set, wherein an element in the record element set is used for marking whether a data block has been modified or not.

Note, in the various embodiments of the present invention, first the size P of the block extent is determined, and then based on the size O of the data source and the size P of the block extent, it is determined how many data blocks the data sources can be divided into. Like existing data copy methods, various embodiments of the present invention also use record elements in the record element set for indicating the update situation of various data blocks. Therefore, in the embodiments of the present invention, the number of data blocks resulting from dividing the data source should be less than or equal to the number M of record elements in the record element set; otherwise, a one-to-one correspondence between a data block and a record element cannot be maintained, and further, elements in the record element set cannot indicate the update situation of data blocks in the data source.

Figure 5:
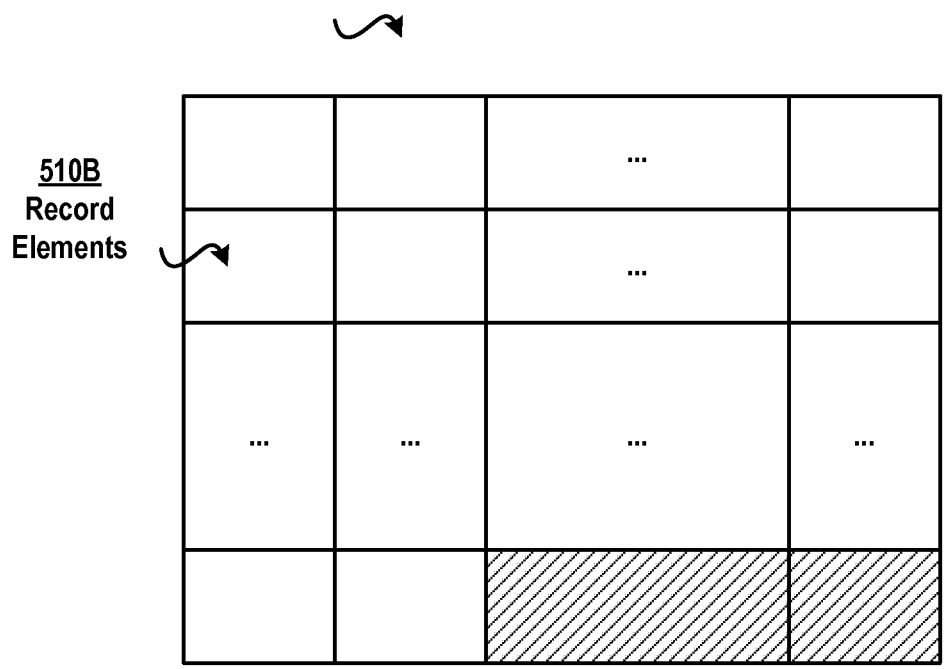
FIG. 5 illustrates a schematic view of the usage situation of a data record element set according to one embodiment of the present invention.

FIG. 5 illustrates a schematic view 500 of the usage situation of a data record element set according to one embodiment of the present invention. In the embodiment shown in FIG. 5, not all record elements 510B in a record element set 500 need to be utilized. For example, only one part of record elements in record element set 500 may be utilized, and remaining record elements can be left NULL (e.g. as shown by record elements in shadow in FIG. 5).

In one embodiment of the present invention, determining the size P of a block extent based on which the data source is divided typically includes determining the minimum value of the size P of the block extent, which makes the number of the data blocks less than or equal to the number M of elements in the record element set.

Note, an example of only using one part of record elements in record element set 500 has been illustrated previously with reference to FIG. 5. However, where the size O of the data source remains the same, the size P of the block extent is inversely proportional to the number of record elements being used. Therefore, it is desired to utilize all data elements in the record element set as far as possible, so as to reduce the granularity of data copy (i.e. reduce the size P of the block extent).

For example, as an example, suppose the size of the data source is 250 G. At this point, if only one record element in the record element set is used for indicating the update situation of a data block (i.e. the entire data source is treated as one data block), although the size of the data block meets the above two alignment relationships, record elements in the record element set will serve no purpose at this point. In other words, as long as data in the data block (i.e. entire data source) is updated, data copy should be executed on the entire data source.

With this in regard, preferably, each record element in the record element set should be utilized efficiently, i.e. the minimum value of the size P of the block extent which satisfies the following three conditions should be found: (1) P should be an integral multiple of the size R of the read/write cell; (2) P should be an integral multiple of the size B of the copy buffer; and (3) the number of data blocks resulting from the division based on P should be less than or equal to the number M of elements in the record element set.

In one embodiment of the present invention, the size of the block extent can be computed using the formula $$P = \left\lfloor \frac{O + N \times M - 1}{N \times M} \right\rfloor \times N,$$

where symbol $\lfloor\ \rfloor$ represents a floor function, and N is the least common multiple of the size B of the copy buffer and the size R of the read/write cell, and M defines the length of the record element set.

By the above formula, the minimum value of the size P of the block extent that satisfies the above three conditions can be calculated conveniently and rapidly, so that each record element in the record element set can be utilized efficiently while reducing occurrences of read/write to the storage medium. At this point, the size of a basic unit (i.e. the size P of the block extent) for executing data copy as observed at higher level is minimized, such that any unforeseen and extreme situation/conditions can be avoided.

In one embodiment, copying data from the data source to a data target in the basic unit of the at least one data block includes: in response to an element in the record element set having been marked, copying a data block associated with the marked element in the data source to the data target. Where the data source has been divided into multiple data blocks, the data copy operation may be executed only on data blocks whose content has been updated, while ones whose content has not been updated are not subjected to any further operation.

In one embodiment of the present invention, copying data from the data source to a data target in the basic unit of the at least one data block includes in response to data in a data block of the at least one data block having been modified, marking an element associated with the data block in the record element set. Note, in this embodiment, a record element in the record element set is marked in response to data in a data block corresponding to the record element having been modified.

Figure 6:
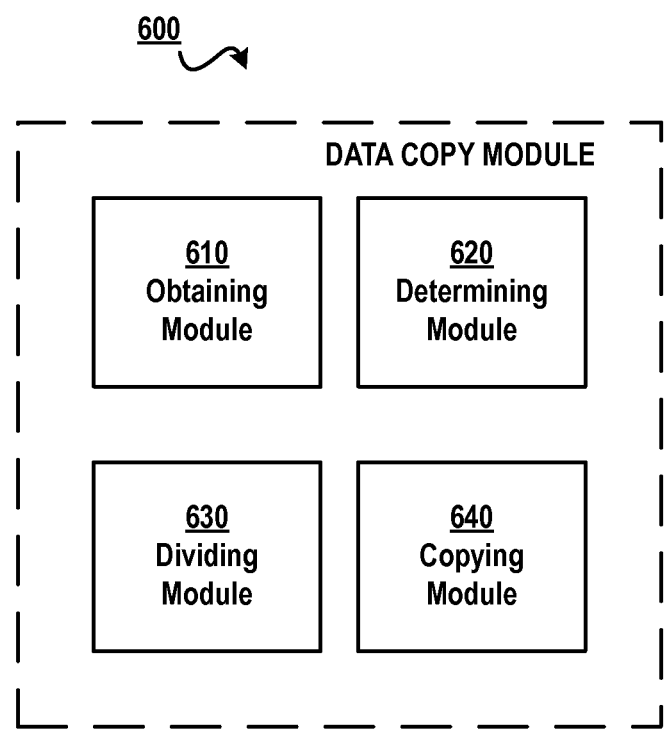
FIG. 6 illustrates a block diagram of an apparatus for data copy according to one embodiment of the present invention.

FIG. 6 illustrates a block diagram 600 of an apparatus for data copy according to an embodiment of the present invention. Specifically, there is provided an apparatus for data copy that hast components such as an obtaining module 610 configured to obtain/identify a data source on which data copy is to be executed; a determining module 620 configured to determine a size P of a block extent based on which the data source is divided; a dividing module 630 configured to divide the data source into at least one data block based on the size P of the block extent; and a copying module 640 configured to copy data from the data source to a data target in the basic unit of the at least one data block; wherein the size P of the block extent is an integral multiple of a size R of a read/write unit supported by underlying architecture. Each of these modules has been illustrated as separate components, but it should be obvious to one skilled in the art, that all or part of these components may be combined achieving the overall result required. The components may be implemented as hardware elements, software elements or a combination of hardware and software.

In one embodiment of the present invention, the read/write cell is a data sector in a disk or data trunk in a Redundant Array of Independent Disks. The size P of the block extent is an integral multiple of the size B of a copy buffer used during copying data from the data source to the data target. In one embodiment of the present invention, the size P of the block extent is an integral multiple of the least common multiple of the size R of the read/write cell and the size B of the copy buffer.

In one embodiment of the present invention, the size P of the block extent makes the number of the resulting data blocks less than or equal to the number M of elements in a record element set, wherein an element in the record element set is used for marking whether a data block has been modified or not. In one embodiment of the present invention, determining module 620 can further include a first determining module configured to determine the minimum value of the size P of the block extent, which makes the number of the data blocks less than or equal to a number M of elements in the record element set.

In one embodiment of the present invention, the size of the block extent $$P = \left\lfloor \frac{O + N \times M - 1}{N \times M} \right\rfloor \times N,$$

where N is the least common multiple of the size B of the copy buffer and the size R of the read/write cell.

In one embodiment, copying module 640 includes a first copying module configured to in response to an element in the record element set having been marked, copying a data block associated with the marked element in the data source to the data target. In one embodiment of the present invention, copying module 640 may further includes a marking module configured to in response to data in a data block of the at least one data block having been modified, mark an element associated with the data block in the record element set.

By means of the method and apparatus as described by the various embodiments of the present invention, it is possible to eliminate such drawbacks that the size P of the block extent obtained according to the length averaging method in the prior art being unaligned with the size B of the copy buffer and the size R of the read/write cell, thereby leading to too many occurrences of copy and additional read/write operations. Further, the efficiency of data copy operations can be improved. Using the various embodiments of the present invention, by setting the size P of the block extent as an integral multiple of the size B of the copy buffer and the size R of the read/write cell, it can be ensured that the capacity of the copy buffer can be utilized efficiently and sufficiently during every single copy, and also it can be ensured that each read/write operation on the storage medium can be executed efficiently so as to improve the efficiency of data copy.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data copy, comprising:
    identifying a data source on which a data copy is to be executed;
    determining a size P of a block extent based on which the data source is divided;
    dividing the data source into portions of at least one basic unit of at least one data block based on the size P of the block extent; and
    copying data from the data source to a data target in the basic unit of the at least one data block; wherein the size P of the block extent is an integral multiple of a size R of a read/write unit enabling each of the at least one data blocks to be aligned with the read/write unit wherein the size P of the block extent is an integral multiple of a size B of a copy buffer, wherein the copy buffer is employed while copying data from the data source to the data target;

wherein the size P of the block extent is an integral multiple of the least common multiple of the size R of the read/write unit and the size B of the copy buffer;

wherein the size P of the block extent creates a number of divided data blocks which is less than or equal to M of elements in a record element set, wherein an element in the record element set is used for marking whether a data block has been modified or not;

wherein determining the size P of the block extent based on which the data source is divided comprises:
determining the minimum value of the size P of the block extent, which makes the number of the data blocks less than or equal to M of elements in the record element set
wherein the size P of the block extent is determined using $$P = \left\lfloor \frac{O + N \times M - 1}{N \times M} \right\rfloor \times N,$$

where N is the least common multiple of the size B of the copy buffer and the size R of the read/write unit, O is the size of the data source and M is the length of the record element set.

2. The method according to claim 1, wherein the read/write unit is a data sector in at least one of a disk and a data trunk in a Redundant Array of Independent Disks (RAID).

3. The method according to Claim 1, wherein copying data from the data source to the data target in the basic unit of the at least one data block further comprises:
in response to an element in the record element set having been marked, copying a data block associated with the marked element in the data source to the data target.

4. The method according to claim 3, further comprising:
in response to a data in the data block of the at least one data block having been modified, marking an element associated with the data block in the record element set.

5. An apparatus for data copy within a data storage system, comprising:
a data copy module, the data copy module configured to
identify a data source on which data copy is to be executed;
determine a size P of a block extent based on which the data source is divided;
divide the data source into portions of at least one basic unit of at least one data block based on the size P of the block extent; and
copying data from the data source to a data target in the basic unit of the at least one data block; wherein the size P of the block extent is an integral multiple of a size R of a read/write unit enabling each of the at least one data blocks to be aligned with the read/write unit;
wherein the size P of the block extent is an integral multiple of a size B of a copy buffer, wherein the copy buffer is employed while copying data from the data source to the data target;
wherein the size P of the block extent is an integral multiple of the least common multiple of the size R of the read/write unit and the size B of the copy buffer;
wherein the size of the block extent $$P = \left\lfloor \frac{O + N \times M - 1}{N \times M} \right\rfloor \times N,$$

where N is the least common multiple of the size B of the copy buffer and the size R of the read/write unit, O is the size of the data source and M is the length of the record element set.

6. The apparatus according to claim 5, wherein the data copy module can further comprise
an obtaining module for identifying a data source on which data copy is to be executed;
a determining module for determining a size P of a block extent based on which the data source is divided;
a dividing module for dividing the data source into at least one data block based on the size P of the block extent; and
a copying module for copying data from the data source to a data target.

7. The apparatus according to claim 6, wherein each of the obtaining module, the determining module, the dividing module and the copying module may be at least one of a hardware element or a software element or a combination thereof.

8. The apparatus according to claim 5, wherein the read/write unit is a data sector in at least one of a disk and a data trunk in a Redundant Array of Independent Disks.

9. The apparatus according to claim 8, wherein the size P of the block extent creates a number of divided data blocks which is less than or equal to M of elements in a record element set, wherein an element in the record element set is used for marking whether a data block has been modified or not.

10. The apparatus according to Claim 5, wherein the determining module is configured to determine the minimum value of the size P of the block extent, which makes the number of the data blocks less than or equal to M of elements in the record element set.

11. The apparatus according to Claim 5, wherein the copying module is configured to in response to an element in the record element set having been marked, copy a data block associated with the marked element in the data source to the data target.

12. The apparatus according to claim 10, wherein the copying module further comprises:
a marking module configured to in response to data in a data block of the at least one data block having been modified, mark an element associated with the data block in the record element set.

* * * * *